United States Patent
Henry et al.

(10) Patent No.: US 10,103,819 B2
(45) Date of Patent: Oct. 16, 2018

(54) QUASI-OPTICAL COUPLER

(71) Applicant: AT&T Intellectual Property I, L.P., Atlanta, GA (US)

(72) Inventors: Paul Shala Henry, Holmdel, NJ (US); Donald J. Barnickel, Flemington, NJ (US); Farhad Barzegar, Branchburg, NJ (US); Robert Bennett, Southold, NY (US); Irwin Gerszberg, Kendall Park, NJ (US); Thomas M. Willis, III, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/706,303

(22) Filed: Sep. 15, 2017

(65) Prior Publication Data

US 2018/0013498 A1   Jan. 11, 2018

Related U.S. Application Data

(63) Continuation of application No. 15/176,247, filed on Jun. 8, 2016, now Pat. No. 9,794,003, which is a
(Continued)

(51) Int. Cl.
*H04B 10/00* (2013.01)
*H04B 10/80* (2013.01)
(Continued)

(52) U.S. Cl.
CPC ............ *H04B 10/802* (2013.01); *H01Q 1/46* (2013.01); *H01Q 13/26* (2013.01); *H01Q 19/10* (2013.01);
(Continued)

(58) Field of Classification Search
CPC ................................................ H04B 3/54–3/60
(Continued)

(56) References Cited

U.S. PATENT DOCUMENTS

| 2,685,068 A * | 7/1954 | Goubau | H01P 3/10 333/21 R |
| 2,852,753 A * | 9/1958 | Lawrence | H01P 3/10 333/240 |

(Continued)

OTHER PUBLICATIONS

"International Preliminary Report on Patentability & Written Opinion", PCT/US2014/061445, dated Jun. 23, 2016, 9 pages.
(Continued)

*Primary Examiner* — Agustin Bello
(74) *Attorney, Agent, or Firm* — Guntin & Gust, PLC; Matthew Tropper

(57) ABSTRACT

A quasi-optical coupling system launches and extracts surface wave communication transmissions from a wire. At millimeter-wave frequencies, where the wavelength is small compared to the macroscopic size of the equipment, the millimeter-wave transmissions can be transported from one place to another and diverted via lenses and reflectors, much like visible light. Transmitters and receivers can be positioned near telephone and power lines and reflectors placed on or near the cables can reflect transmissions onto or off of the cables. The lenses on the transmitters are focused, and the reflectors positioned such that the reflected transmissions are guided waves on the surface of the cables. The reflectors can be polarization sensitive, where one or more of a set of guided wave modes can be reflected off the wire based on the polarization of the guided wave modes and polarization and orientation of the reflector.

20 Claims, 11 Drawing Sheets

Related U.S. Application Data continuation of application No. 14/927,653, filed on Oct. 30, 2015, now Pat. No. 9,479,266, which is a continuation of application No. 14/101,567, filed on Dec. 10, 2013, now Pat. No. 9,209,902.

(51) Int. Cl.

| | |
|---|---|
| *H04B 3/54* | (2006.01) |
| *H04B 3/56* | (2006.01) |
| *H04B 3/52* | (2006.01) |
| *H04B 10/50* | (2013.01) |
| *H01Q 13/26* | (2006.01) |
| *H01Q 1/46* | (2006.01) |
| *H01Q 19/10* | (2006.01) |

(52) U.S. Cl.
CPC .............. *H04B 3/52* (2013.01); *H04B 3/54* (2013.01); *H04B 3/56* (2013.01); *H04B 10/501* (2013.01); *H04B 2203/5483* (2013.01)

(58) Field of Classification Search
USPC .................. 398/115–117, 140; 333/240
See application file for complete search history.

(56) References Cited

U.S. PATENT DOCUMENTS

| | | | | |
|---|---|---|---|---|
| 2,921,277 A * | 1/1960 | Goubau | ............ | H01P 3/10 333/240 |
| 3,201,724 A * | 8/1965 | Hafner | ............ | H01P 3/10 333/240 |
| 3,509,463 A * | 4/1970 | Woodward | ............ | H01P 3/10 333/240 |
| 3,683,299 A * | 8/1972 | Feodosievich | ............ | H01P 3/16 333/240 |
| 4,278,955 A * | 7/1981 | Lunden | ............ | H01P 3/10 333/238 |
| 4,730,172 A * | 3/1988 | Bengeult | ............ | H01P 3/10 333/240 |
| 4,743,916 A * | 5/1988 | Bengeult | ............ | H01Q 13/20 343/707 |
| 4,772,891 A * | 9/1988 | Svy | ............ | H01Q 1/30 343/707 |
| 5,065,165 A * | 11/1991 | Blaisdell | ............ | H01Q 19/06 333/240 |
| 5,889,449 A * | 3/1999 | Fiedziuszko | ............ | H01P 1/203 333/239 |
| 5,982,276 A * | 11/1999 | Stewart | ............ | H04B 3/56 340/12.32 |
| 6,239,377 B1 * | 5/2001 | Nishikawa | ............ | H01B 7/0233 174/110 F |
| 6,384,700 B1 * | 5/2002 | Craine | ............ | H01Q 1/28 333/240 |
| 6,452,467 B1 * | 9/2002 | McEwan | ............ | G01S 7/02 333/240 |
| 6,686,832 B2 * | 2/2004 | Abraham | ............ | H04B 3/542 340/12.33 |
| 6,765,479 B2 * | 7/2004 | Stewart | ............ | H04B 3/54 333/100 |
| 6,788,951 B2 * | 9/2004 | Aoki | ............ | H04L 1/0007 340/936 |
| 6,870,465 B1 * | 3/2005 | Song | ............ | H04B 3/54 333/1 |
| 6,909,893 B2 * | 6/2005 | Aoki | ............ | H04W 16/32 340/905 |
| 6,922,135 B2 * | 7/2005 | Abraham | ............ | H04B 3/542 340/12.38 |
| 6,950,567 B2 * | 9/2005 | Kline | ............ | H02G 11/02 307/3 |
| 7,009,471 B2 * | 3/2006 | Elmore | ............ | H01P 3/10 333/240 |
| 7,113,134 B1 * | 9/2006 | Berkman | ............ | H01Q 1/22 343/702 |
| 7,132,950 B2 * | 11/2006 | Stewart | ............ | G01R 15/142 324/142 |
| 7,248,148 B2 * | 7/2007 | Kline | ............ | H01Q 1/007 307/3 |
| 7,280,033 B2 * | 10/2007 | Berkman | ............ | H04B 3/542 340/12.32 |
| 7,567,154 B2 * | 7/2009 | Elmore | ............ | H01P 3/10 333/21 R |
| 7,590,404 B1 * | 9/2009 | Johnson | ............ | H01Q 1/246 455/39 |
| 7,626,489 B2 * | 12/2009 | Berkman | ............ | G02B 6/483 340/12.32 |
| 7,764,943 B2 * | 7/2010 | Radtke | ............ | H04B 3/54 340/538 |
| 7,795,877 B2 * | 9/2010 | Radtke | ............ | G01R 19/16547 324/530 |
| 7,795,994 B2 * | 9/2010 | Radtke | ............ | H04B 3/56 333/100 |
| 7,929,940 B1 * | 4/2011 | Dianda | ............ | H04B 3/542 340/500 |
| 8,159,385 B2 * | 4/2012 | Farneth | ............ | G01S 13/04 342/118 |
| 8,212,635 B2 * | 7/2012 | Miller, II | ............ | H01P 5/12 333/115 |
| 8,237,617 B1 * | 8/2012 | Johnson | ............ | H01Q 13/26 343/785 |
| 8,253,516 B2 * | 8/2012 | Miller, II | ............ | H01P 3/10 333/24 R |
| 8,269,583 B2 * | 9/2012 | Miller, II | ............ | H04L 12/40013 333/240 |
| 8,344,829 B2 * | 1/2013 | Miller, II | ............ | H01P 5/12 333/24 R |
| 8,412,130 B2 * | 4/2013 | Suematsu | ............ | H01Q 3/02 381/160 |
| 8,497,749 B2 * | 7/2013 | Elmore | ............ | H01P 3/10 333/21 R |
| 8,810,421 B2 * | 8/2014 | Deaver, Sr. | ............ | G08B 25/06 340/3.44 |
| 8,897,697 B1 * | 11/2014 | Bennett | ............ | H04B 7/022 340/531 |
| 9,103,864 B2 * | 8/2015 | Ali | ............ | G01R 31/021 |
| 9,209,902 B2 * | 12/2015 | Henry | ............ | H01Q 1/46 |
| 9,479,266 B2 * | 10/2016 | Henry | ............ | H01Q 1/46 |
| 9,699,785 B2 * | 7/2017 | Henry | ............ | H04W 36/22 |
| 9,749,053 B2 * | 8/2017 | Henry | ............ | H01P 5/12 |
| 9,793,954 B2 * | 10/2017 | Bennett | ............ | H04B 3/56 |
| 9,794,003 B2 * | 10/2017 | Henry | ............ | H04B 10/802 |
| 9,876,584 B2 * | 1/2018 | Henry | ............ | H04B 10/802 |
| 2002/0002040 A1 * | 1/2002 | Kline | ............ | H04B 3/56 455/402 |
| 2003/0190110 A1 * | 10/2003 | Kline | ............ | H02G 11/02 385/15 |
| 2004/0054425 A1 * | 3/2004 | Elmore | ............ | H04B 10/25752 700/1 |
| 2004/0113756 A1 * | 6/2004 | Mollenkopf | ............ | H04B 3/542 370/351 |
| 2004/0169572 A1 * | 9/2004 | Elmore | ............ | H01P 3/10 333/240 |
| 2004/0212481 A1 * | 10/2004 | Abraham | ............ | H04B 3/542 370/487 |
| 2005/0017825 A1 * | 1/2005 | Hansen | ............ | H04B 3/54 333/242 |
| 2005/0069321 A1 * | 3/2005 | Sullivan | ............ | H04B 3/56 398/116 |
| 2005/0111533 A1 * | 5/2005 | Berkman | ............ | H04B 3/542 375/220 |
| 2005/0258920 A1 * | 11/2005 | Elmore | ............ | H01P 3/10 333/240 |
| 2006/0192672 A1 * | 8/2006 | Gidge | ............ | H04B 3/58 340/538.11 |
| 2008/0064331 A1 * | 3/2008 | Washiro | ............ | H04B 5/0012 455/41.1 |

(56) References Cited

U.S. PATENT DOCUMENTS

| | | | | |
|---|---|---|---|---|
| 2008/0153416 | A1* | 6/2008 | Washiro | H04B 5/00 455/41.1 |
| 2008/0211727 | A1* | 9/2008 | Elmore | H01P 3/10 343/773 |
| 2009/0079660 | A1* | 3/2009 | Elmore | H04B 3/56 343/904 |
| 2009/0258652 | A1* | 10/2009 | Lambert | H04W 88/04 455/446 |
| 2010/0045447 | A1* | 2/2010 | Mollenkopf | G02B 6/483 340/538 |
| 2010/0085036 | A1* | 4/2010 | Banting | G01R 15/14 324/127 |
| 2010/0119234 | A1* | 5/2010 | Suematsu | H01Q 3/02 398/135 |
| 2011/0110404 | A1* | 5/2011 | Washiro | H04B 5/00 375/219 |
| 2011/0132658 | A1* | 6/2011 | Miller, II | H04L 12/40013 174/70 R |
| 2011/0187578 | A1* | 8/2011 | Farneth | G01S 13/04 342/27 |
| 2013/0002409 | A1* | 1/2013 | Molina | H04B 3/542 340/12.32 |
| 2013/0064311 | A1* | 3/2013 | Turner | H01P 3/00 375/259 |
| 2014/0009270 | A1* | 1/2014 | Yamazaki | H01L 29/7869 340/12.22 |
| 2014/0155054 | A1* | 6/2014 | Henry | H04W 36/22 455/422.1 |
| 2014/0285277 | A1* | 9/2014 | Herbsommer | H01P 3/16 333/1 |
| 2015/0162988 | A1* | 6/2015 | Henry | H01Q 1/46 398/200 |
| 2016/0050028 | A1* | 2/2016 | Henry | H01Q 1/46 398/116 |
| 2016/0211566 | A1* | 7/2016 | Kikuchi | H04B 7/24 |
| 2016/0285512 | A1* | 9/2016 | Henry | H01Q 1/46 |
| 2016/0380701 | A1* | 12/2016 | Henry | H01Q 1/46 398/200 |

OTHER PUBLICATIONS

"International Search Report & Written Opinion", PCT/US2014/061445, dated Feb. 10, 2015, 13 pages.

Akalin, Tahsin et al., "Single-Wire Transmission Lines at Terahertz Frequencies", IEEE Transactions on Microwave Theory and Techniques, vol. 54, No. 6, 2006, 2762-2767.

Alam, M. N. et al., ""Novel surface wave exciters for power line fault detection and communications"", Antennas and Propagation (APSURSI), 2011 IEEE International Symposium On, IEEE, Jul. 3, 2011, 1139-1142.

Barlow, H. M. et al., "Surface Waves", 621.396.11 : 538.566, Paper No. 1482 Radio Section, 1953, pp. 329-341.

CIPO, "Office Action dated Feb. 3, 2017 for Canadian application 2,928,355", 1-4.

Corridor Systems, "A New Approach to Outdoor DAS Network Physical Layer Using E-Line Technology", Mar. 2011, 5 pages.

Goubau, Georg et al., "Investigation of a Surface-Wave Line for Long Distance Transmission", 1952, 263-267.

Goubau, Georg et al., "Investigations with a Model Surface Wave Transmission Line", IRE Transactions on Antennas and Propagation, 1957, 222-227.

Goubau, Georg, "Open Wire Lines", IRE Transactions on Microwave Theory and Techniques, 1956, 197-200.

Goubau, Georg, "Single-Conductor Surface-Wave Transmission Lines", Proceedings of the I.R.E., 1951, 619-624.

Goubau, Georg, "Surface Waves and Their Application to Transmission Lines", Radio Communication Branch, Coles Signal Laboratory, Mar. 10, 1950, 1119-1128.

Goubau, Georg, "Waves on Interfaces", IRE Transactions on Antennas and Propagation, Dec. 1959, 140-146.

Ren-Bin, Zhong et al., "Surface plasmon wave propagation along single metal wire", Chin. Phys. B, vol. 21, No. 11, May 2, 2012, 9 pages.

Sommerfeld, A., "On the propagation of electrodynamic waves along a wire", Annals of Physics and Chemistry New Edition, vol. 67, No. 2, 1899, 72 pages.

Wang, Kanglin , "Dispersion of Surface Plasmon Polaritons on Metal Wires in the Terahertz Frequency Range", Physical Review Letters, PRL 96, 157401, 2006, 4 pages.

* cited by examiner

QUASI-OPTICAL COUPLER

CROSS REFERENCE TO RELATED APPLICATIONS

This application is a Continuation of and claims priority to U.S. patent application Ser. No. 15/176,247, filed Jun. 8, 2016, which is a Continuation of and claims priority to U.S. patent application Ser. No. 14/927,653, filed Oct. 30, 2015 (now U.S. Pat. No. 9,479,266), which is a Continuation of and claims priority to U.S. patent application Ser. No. 14/101,567, filed Dec. 10, 2013 (now U.S. Pat. No. 9,209,902). The contents of each of the foregoing is/are hereby incorporated by reference into this application as if set forth herein in full.

FIELD OF THE DISCLOSURE

The subject disclosure relates to wireless communications, e.g., to providing connectivity to base stations and distributed antennas using millimeter wavelength surface wave communications.

BACKGROUND

As smart phones and other portable devices increasingly become ubiquitous, and data usage skyrockets, macrocell base stations and existing wireless infrastructure are being overwhelmed. To provide additional mobile bandwidth, small cell deployment is being pursued, with microcells and picocells providing coverage for much smaller areas than traditional macrocells, but at high expense.

DETAILED DESCRIPTION

Figure 1:
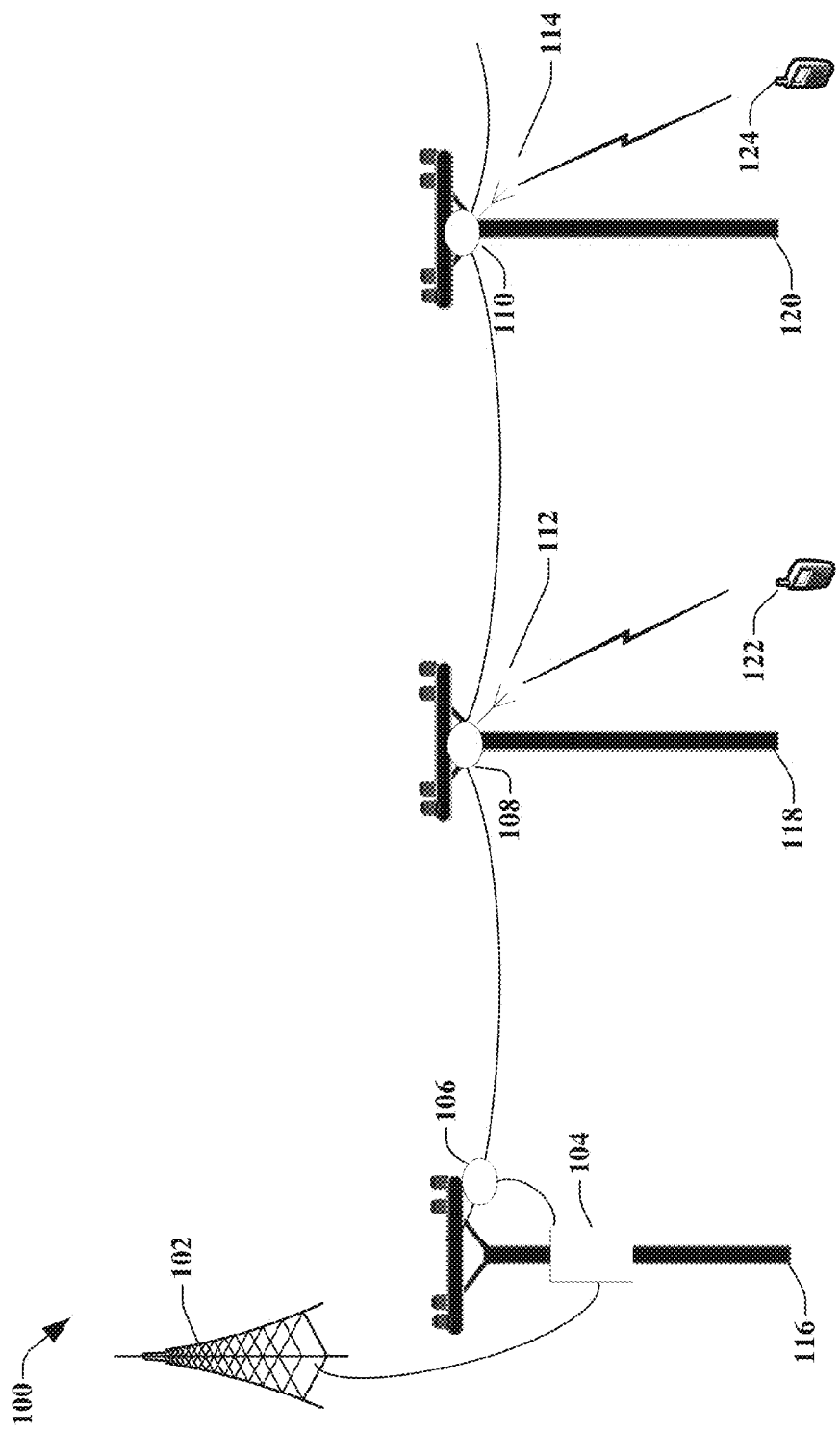
FIG. 1 is a block diagram illustrating an example, non-limiting embodiment of a surface wave communications system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To provide network connectivity to additional base stations, the backhaul network that links the microcells and macrocells to the core network correspondingly expands. Similarly, to provide network connectivity to a distributed antenna system, the communication system that links base stations and their distributed antennas correspondingly expands. A surface wave communication system can be provided to enable the increased network connectivity and a quasi-optical coupling system can be provided to transmit and receive surface wave communications on a wire.

For these considerations as well as other considerations, in one or more embodiments, an apparatus includes a transmitter that emits a transmission, wherein a wavelength of the transmission corresponds to a millimeter-wave band. The apparatus also includes a reflector, positioned with respect to a wire such that the reflector reflects the transmission in a direction substantially parallel to the wire thereby resulting in a reflected transmission, wherein the reflected transmission is a guided wave that is guided based on a surface of the wire.

In another embodiment, an apparatus includes a reflector, positioned with respect to a wire such that the reflector reflects an incoming transmission away from the wire, wherein the incoming transmission is a guided wave that is guided based on a surface of the wire that travels in a direction substantially parallel to the wire. The apparatus also includes a receiver that receives the incoming transmission, wherein a wavelength of the incoming transmission corresponds to a millimeter-wave band.

In another embodiment, a method includes emitting, by a transmission device, a transmission towards a first side of a reflector that is near a wire, wherein the transmission comprises a wavelength corresponding to a millimeter-wave band. The method also includes reflecting the transmission in a direction substantially parallel to the wire resulting in a reflected transmission, wherein the reflected transmission is a guided wave on a surface of the wire.

Various embodiments described herein relate to a quasi-optical coupling system for launching and extracting surface wave communication transmissions from a wire. At millimeter-wave frequencies, where the wavelength is small compared to the macroscopic size of the equipment, the millimeter-wave transmissions can be transported from one place to another and diverted via lenses and reflectors, much like visible light. Transmitters and receivers can be positioned near telephone and power lines and reflectors placed on or near the cables can reflect transmissions onto or off of the cables. The lenses on the transmitters are focused, and the reflectors positioned such that the reflected transmissions become guided waves on the surface of the cables. The reflectors can be polarization sensitive, where one or more of a set of guided wave modes can be reflected off the wire based on the polarization of the guided wave modes and polarization and orientation of the reflector.

Referring now to FIG. 1, a block diagram illustrating an example, non-limiting embodiment of a surface wave communication system 100 is shown. Surface wave communication system 100 depicts an exemplary environment in which a quasi-optical coupling system can be used.

Surface wave communication system 100 can be a distributed antenna system that includes one or more base stations (e.g., base station device 104) that are communicably coupled to a macrocell site 102 or other network connection. Base station device 104 can be connected by fiber and/or cable, or by a microwave wireless connection to macrocell site 102. Macrocells such as macrocell site 102 can have dedicated connections to the mobile network and base station device 104 can piggyback off of macrocell site 102's connection. Base station device 104 can be mounted on, or attached to, utility pole 116. In other embodiments, base station device 104 can be near transformers and/or other locations situated nearby a power line.

Base station device 104 can facilitate connectivity to a mobile network for mobile devices 122 and 124. Antennas 112 and 114, mounted on or near utility poles 118 and 120 can receive signals from base station device 104 and transmit those signals to mobile devices 122 and 124 over a much wider area than if the antennas 112 and 114 were located at or near base station device 104.

It is to be appreciated that FIG. 1 displays three utility poles, with one base station device, for purposes of simplicity. In other embodiments, utility pole 116 can have more base station devices, and one or more utility poles with distributed antennas are possible.

A quasi-optical coupling device 106 can transmit the signal from base station device 104 to antennas 112 and 114 over a power line(s) that connect the utility poles 116, 118, and 120. To transmit the signal, radio source and/or coupler 106 upconverts the signal (via frequency mixing) from base station device 104 to a millimeter-wave band signal and the quasi-optical coupling device 106 launches a millimeter-wave band surface-wave (via embodiments shown in FIGS. 2, 4, and 5) that propagates as a guided wave traveling along the wire. At utility pole 118, another quasi-optical coupling device 108 receives the surface-wave (e.g., FIG. 3) and can amplify it and send it forward on the power line. The quasi-optical coupling device 108 can also extract a signal from the millimeter-wave band surface-wave and shift it down in frequency to its original cellular band frequency (e.g., 1.9 GHz or other cellular frequency). An antenna 112 can transmit the downshifted signal to mobile device 122. The process can be repeated by quasi-optical coupling device 110, antenna 114 and mobile device 124.

Transmissions from mobile devices 122 and 124 can also be received by antennas 112 and 114 respectively. Repeaters on quasi-optical coupling devices 108 and 110 can upshift the cellular band signals to millimeter-wave band and transmit the signals as surface-wave transmissions over the power line(s) to base station device 104.

In an embodiment, system 100 can employ diversity paths, where two or more wires are strung between the utility poles 116, 118, and 120 and redundant transmissions from base station 104 are transmitted as guided waves down the surface of the wires. The wires can be both insulated and uninsulated, and depending on the environmental conditions that cause transmission losses, the coupling devices can selectively receive signals from the insulated or uninsulated wires. The selection can be based on measurements of the signal-to-noise ratio of the wires, or based on determined weather/environmental conditions (e.g., moisture detectors, weather forecasts, and etc.).

It is to be appreciated that the use of the quasi-optical coupling devices 106, 108, and 110 in FIG. 1 are exemplary, and that in other embodiments, other uses are possible. For instance, quasi-optical coupling devices can be used in a backhaul communication system, providing network connectivity to base stations. Quasi-optical coupling devices can be used in any circumstance where it is desirable to transmit surface wave communications over a wire, insulated or not insulated. Quasi-optical coupling devices are improvements over other coupling devices due to the limited contact with the wires. Usually, when working with medium or high voltage power cables, specially trained technicians are required, but with quasi-optical coupling devices, the apparatus is located away from the wire, allowing for cheap and easy installation.

Figure 2:
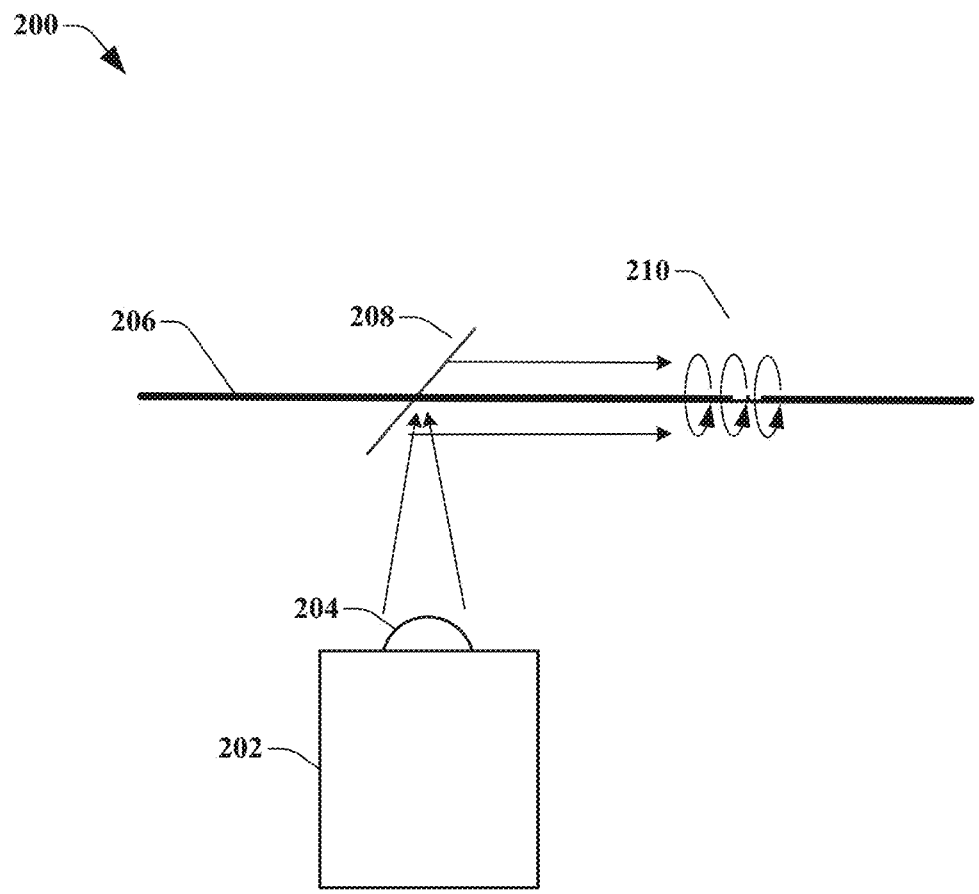
FIG. 2 is a block diagram illustrating an example, non-limiting embodiment of a quasi-optical transmitter in accordance with various aspects described herein.

Turning now to FIG. 2, illustrated is a block diagram of an example, non-limiting embodiment of a quasi-optical transmitter in accordance with various aspects described herein. System 200 includes a transmitter 202 that generates and emits a transmission that is in a millimeter-wave band. The transmission that is generated by the transmitter 202 can be based on a signal received from base station device 104 or mobile devices 122 or 124. Lens 204 can focus the millimeter-wave transmission towards a reflector 208 that is positioned such that the reflected transmission travels in a direction substantially parallel to the wire 206. The reflected transmission then propagates as a guided wave travelling along the wire 206. The guided wave, or surface wave, will stay parallel to the wire 206, even as the wire 206 bends and flexes. Bends can increase transmission losses, which are also dependent on wire diameters, frequency, and materials.

In an embodiment, the transmitter 202 is positioned and the lens 204 is focused such that the transmission emitted is focused to where the reflector 208 and wire 206 meet. The focal point (i.e., beam waist) can be larger than a diameter of wire 206 but as the transmission is reflected, the reflected transmission propagates in a direction substantially parallel to the wire 206, thus launching surface wave 210.

It is to be appreciated that the word "parallel" is a mathematical term of art that means that parallel lines are lines in plane which do not intersect or touch at any point. The term parallel as a mathematical construct is often not achievable in real systems due to various electro, mechanical, or other interfering force. In this disclosure, parallel and substantially parallel are used in such a way as to encompass the mathematical definition of parallel as well as minor deviations therefrom where for practical purposes or intents, a parallel characteristic has been achieved.

The lens 204 can be a dielectric lens (e.g., a Luneburg lens). The transmitter 202 can be a millimeter-wave monolithic integrated circuit with a feed that illuminates the lens 204.

In an embodiment, the transmission that is emitted by the transmitter 202 can exhibit one or more waveguide modes. The waveguide modes can be dependent on the shape and/or design of the waveguide. After the reflection by the reflector 208, the one or more waveguide modes can couple to one or more surface wave modes of the guided surface wave 210. The surface wave modes can be different than the waveguide modes due to the different characteristics of the waveguide and the wire. For instance, surface wave modes can include the fundamental transverse electromagnetic mode (Quasi-$TEM_{00}$), where only very small electrical and/or magnetic fields extend in the direction of propagation, and the fields extend radially outwards. This surface wave mode does not exist inside a waveguide that is hollow. Therefore, the waveguide modes that are used by transmitter 202 are waveguide modes that can couple effectively and efficiently to surface wave modes of wire 206.

It is to be appreciated that guided surface wave 210 is shown using three circular symbols in FIG. 2. These symbols are used to represent a general surface wave, but do not imply that the surface wave 210 is circularly polarized or otherwise circularly oriented. In fact, surface wave 210 can include a fundamental TEM mode where the fields extend radially outwards, and also include other, higher level modes.

In an embodiment, the wavelength of the transmission is comparable in size, or smaller than a circumference of the wire 206. In an example, if the wire 206 has a diameter of 0.5 cm, and a corresponding circumference of around 1.5 cm, the wavelength of the transmission is around 1.5 cm or less, corresponding to a frequency of 20 GHz or greater. In another embodiment, an ideal frequency of the transmission and the carrier-wave signal is around 38 GHz. In experimental results, when the circumference of the wire 206 is comparable in size to, or greater, than a wavelength of the transmission, the surface wave 210 exhibits a plurality of surface-wave modes. The surface wave 210 can therefore comprise more than one type of electrical and magnetic field configuration. As the surface wave 210 propagates down the wire 206, the plurality of electrical and magnetic field configurations will remain the same from end to end of the wire 206.

Figure 3:
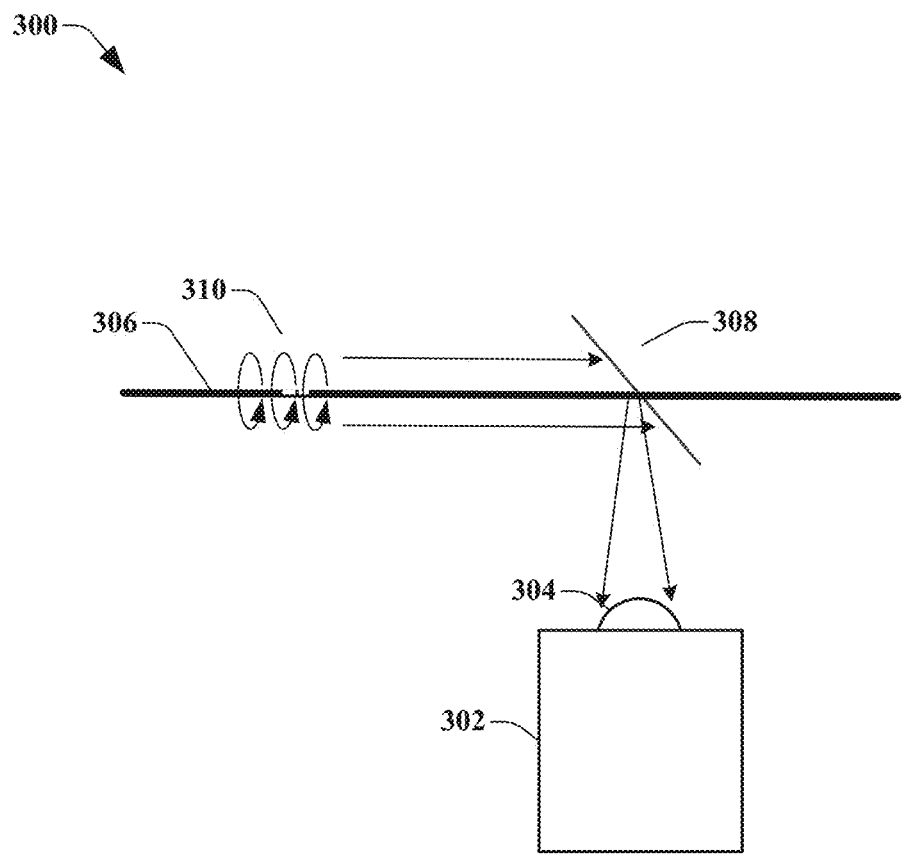
FIG. 3 is a block diagram illustrating an example, non-limiting embodiment of a quasi-optical receiver in accordance with various aspects described herein.

Turning now to FIG. 3, illustrated is block diagram of an example, non-limiting embodiment of a quasi-optical receiver system 300. Quasi-optical receiver system 300 includes a receiver 302 that receives a transmission that is reflected from a reflector 308 positioned on or near a wire 306. The transmission that is reflected off of reflector 308 can be from a guided wave surface wave 310 that travels along the wire 306 until it is reflected by reflector 308. A lens 304 can focus the reflected transmission into a waveguide feed associated with the receiver 302.

The surface wave 310 can be a guided wave that was transmitted by a transmitter (as show in FIG. 2) and the surface wave 310 can exhibit one or more modes that are associated with surface waves on a wire. After the reflection by the reflector 308, the one or more surface wave modes can couple to one or more waveguide modes that are dependent on the design and configuration of the waveguide feed in the receiver 302. The waveguide modes can be different than the surface wave modes due to the different characteristics of the wire and the waveguide.

An exemplary surface wave mode of the surface wave 310 can be a fundamental transverse electromagnetic mode (Quasi-TEM$_{00}$), where only small electrical and magnetic fields extend in the direction of propagation, and the fields extend radially outwards. The mode pattern is symmetric with regard to the longitudinal axis of the wire 306. If the mode pattern is symmetric, it does not matter at which orientation around the wire 306 that the reflector 308 and receiver 302 are placed with respect to each other. According to experimental results however, when the circumference of the wire 306 is comparable in size to, or greater, than a wavelength of the transmission, multi-mode behavior is exhibited and at least one of the modes present is asymmetrical, as periodic nulls are experienced when rotating the receiver 302 and reflector 308 around the wire 306 with respect to a transmitter that originated the transmission.

Figure 4:
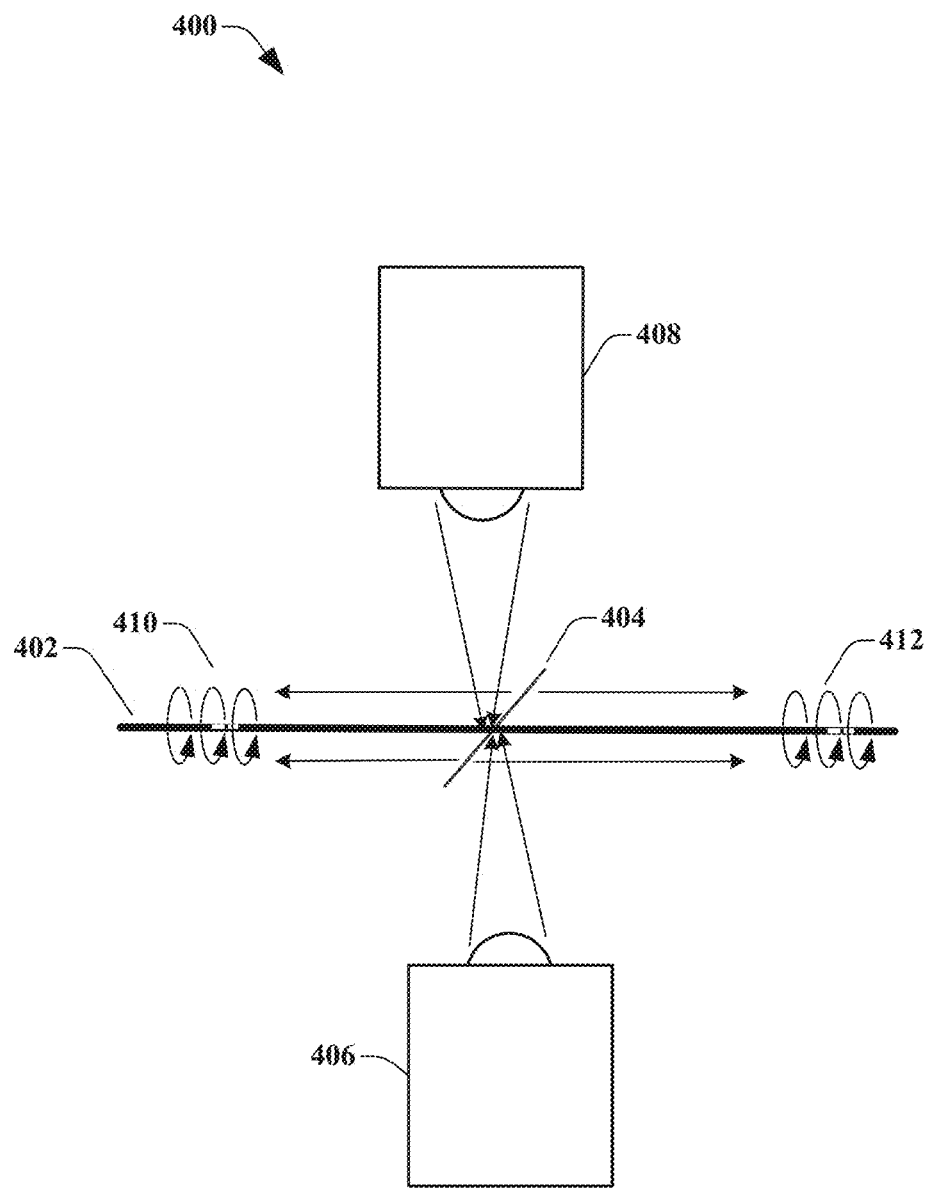
FIG. 4 is a block diagram illustrating an example, non-limiting embodiment of a bidirectional quasi-optical transmitter in accordance with various aspects described herein.

Turning now to FIG. 4, illustrated is a block diagram of an example, non-limiting embodiment of a bidirectional quasi-optical transmitter. System 400 includes two transmitters, 408 and 406 that generate and emit transmissions that are in a millimeter-wave band. The transmission that is generated by the transmitters 406 and 408 can be based on a signal received from a base station or mobile device (e.g., base station device 104 or mobile devices 122 or 124). The transmissions from transmitters 406 and 408 reflect off of reflector 404 and propagate down wire 402 in opposite directions as surface wave transmissions 412 and 410 respectively.

In an embodiment, the surface of both sides of reflector 404 are reflective, allowing a single reflector to be used with the transmitters 406 and 408 being positioned on opposite and/or opposing sides of wire 402. In other embodiments multiple reflectors can be used and positioned such that transmitters 406 and 408 can be placed in many different positions and orientations with respect to each other. In an exemplary embodiment, reflector 404 can be substantially "V" shaped or similar shape that allows transmitters 406 and 408 to be placed next to each other and oriented in such a way that transmissions generated by the transmitter 406 and 408 are reflected off the reflector 404 so that the surface wave transmissions 410 and 412 travel in opposite directions on opposite sections of wire 402.

In an alternative embodiment, transmitters 406 and 408 can also include receivers and be configured to receive surface wave transmissions that are reflected off of the wire 402 by reflector 404. The reflected transmissions can be focused by lenses onto waveguide feeds associated with receiver/transmitters 406 and 408.

Figure 5:
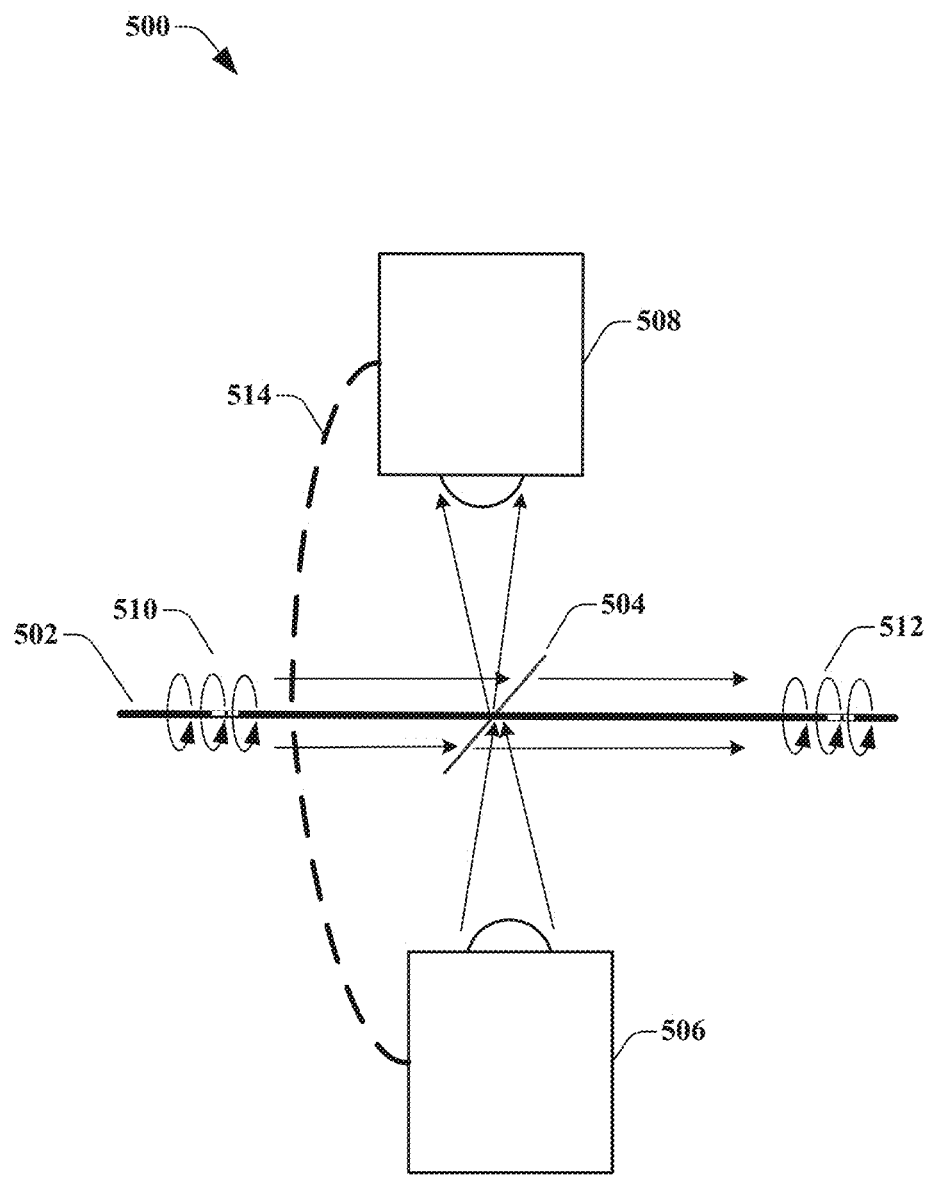
FIG. 5 is a block diagram illustrating an example, non-limiting embodiment of a quasi-optical repeater in accordance with various aspects described herein.

Turning now to FIG. 5, illustrated is a block diagram of an example, non-limiting embodiment of a quasi-optical repeater system 500. Repeater system 500 includes a transmitter 506 and a receiver 508 that receive a surface wave transmission 510 and retransmits as surface wave transmission 512 along a wire 502.

In an embodiment, surface wave 510 can propagate along wire 502 and be reflected off the wire by reflector 504 towards receiver 508. Receive 508 can then pass the transmission via a communications link 514 to transmitter 506. Transmitter 506 generates another transmission based on the transmission received by receiver 508. The new transmission can be emitted towards reflector 504 such that the reflected transmission is in a direction substantially parallel to the wire 502 and propagates as a guided wave surface wave transmission 512.

Between receiver 508 and transmitter 506, along link 514, the signal can be amplified to correct for signal loss and other inefficiencies associated with surface wave communications. In an embodiment, a signal can be extracted from the transmission and processed and otherwise emitted to mobile devices 122 and 124 via antennas 112 and 114. Similarly, signals and/or communications received by antennas 112 and 114 from mobile devices 122 and 124 can be inserted into the transmission that is generated by transmitter 506. Accordingly, the repeater system 500 depicted in FIG. 5 can be comparable in function to the quasi-optical coupling devices 108 and 110 in FIG. 1.

It is to be appreciated that although FIG. 5 shows surface wave transmissions 510 and 512 entering from the left and exiting to the right respectively, that is merely a simplification and is not intended to be limiting. In other embodiments, receiver 508 and transmitter 506 can also function as transmitters and receivers respectively, allowing the repeater system 500 to be bi-directional. It is also to be appreciated that while reflector 504 reflects to and from receiver 508 and transmitter 506, in other embodiments multiple reflectors can be used and positioned such that receiver 508 and transmitter 506 can be placed in many different positions and orientations with respect to each other. In an exemplary embodiment, reflector 504 can be substantially "V" shaped or similar shape that allows receiver 508 and transmitter 506 to be placed next to each other.

Figure 6:
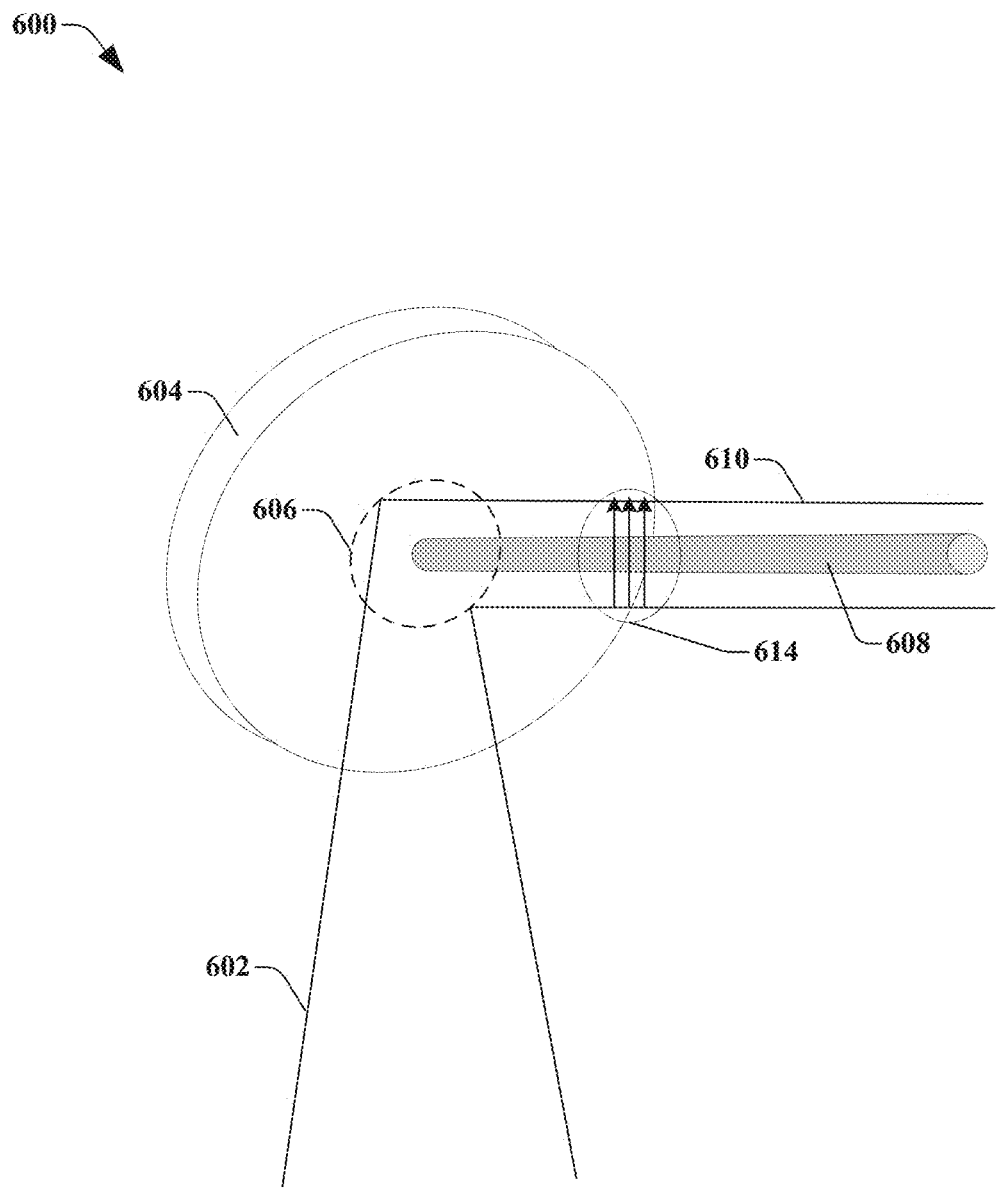
FIG. 6 is a block diagram illustrating an example, non-limiting embodiment of a reflector in a quasi-optical coupling system in accordance with various aspects described herein.

Referring now to FIG. 6, depicted is a block diagram illustrating an example, non-limiting embodiment of a reflector 604 in a quasi-optical coupling system 600. Reflector 604 reflects a transmission 602 that was emitted by a transmitter (e.g., transmitter 202) substantially parallel to wire or cable 608 so that the reflected transmission 612 propagates down the wire/cable 608 as a guided wave surface wave. In particular, the transmission 602 couples to a guided wave mode 614 that is associated with surface wave modes along a wire.

The transmitter, and a lens (e.g., lens 204) on the transmitter focus the transmission 602 such that the focal point is at the intersection of the wire 608 and the reflector 604, as shown by focal plane 606. The transmitter thus focuses the transmission at the intersection of the wire 608 and the reflector 604, and the reflected transmission propagates along the wire 608, substantially parallel to the wire 608.

When the reflecting the transmission 602 into surface wave 610, there can be coupling inefficiencies that cause transmission loss. These coupling inefficiencies can be reduced by ensuring that the focal plane 606 of the lens is at the intersection of the reflector and the wire. The coupling inefficiencies can also be reduced by matching the size of the intersection area near focal plane 606 to the size of the mode 614 on the wire.

Figure 7:
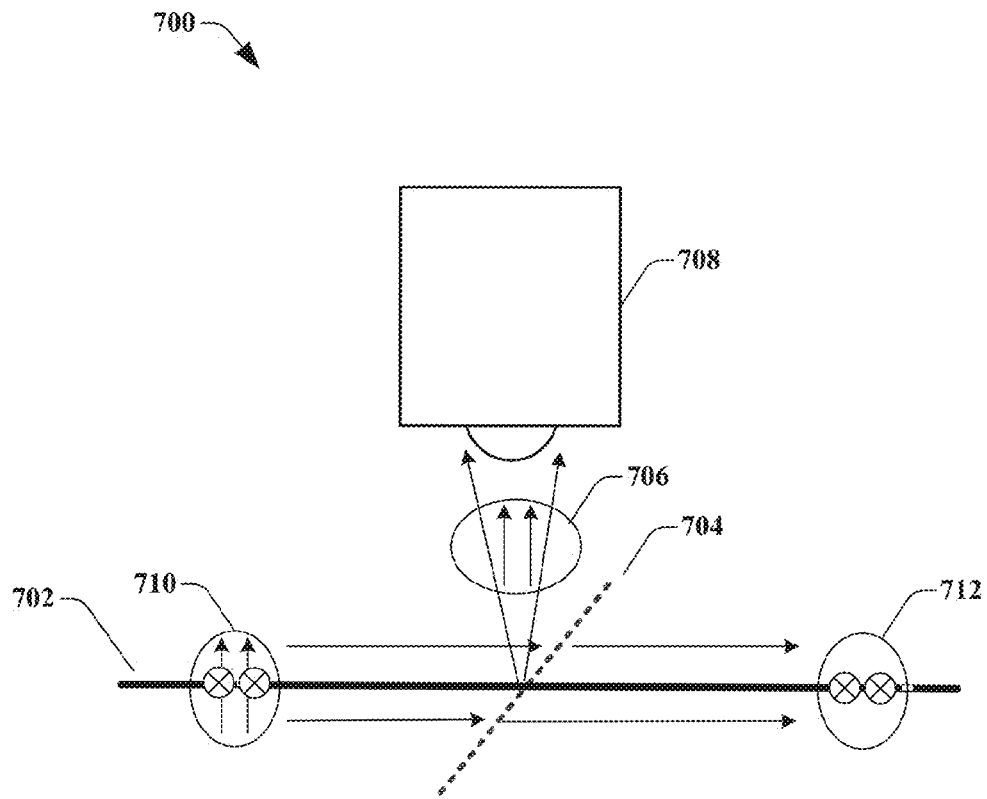
FIG. 7 is a block diagram illustrating an example, non-limiting embodiment of a polarization sensitive quasi-optical coupling system in accordance with various aspects described herein.

Turning now to FIG. 7, illustrated is a block diagram of an example, non-limiting embodiment of a polarization sensitive quasi-optical coupling system 700. Polarization sensitive quasi-optical coupling system 700 includes a polarized and/or polarization sensitive reflector 704 that reflects towards a receiver 708 a polarized portion 706 of a surface wave transmission 710, while allowing another (differently polarized) portion 712 to continue propagating down wire 702.

In an embodiment, surface wave transmission 710 as it propagates along wire 702, can contain one or more guided wave modes that are polarized. The polarization can include circular polarization modes as well as horizontal and vertical polarization modes. The reflector 704 can reflect the component or mode 706 of the surface wave transmission 710 that is polarized parallel to a polarization vector of the reflector 704. The reflector 704 can let pass through without reflection the component 712 of the surface wave transmission 710 that is not polarized parallel to a polarization vector of the reflector 704.

In the embodiment shown in FIG. 7, reflector 704 can be comprised of a closely spaced array of straight metal wires (although other means of polarizing a reflector are known to those having ordinary skill in the art) that are oriented horizontally pointing into and out of the diagram. Surface wave transmission 710 can have guided wave modes, one oriented into the diagram, while the other is polarized vertically. The horizontally polarized mode is polarized parallel to the polarization vector of the reflector 704 and therefore is reflected towards receiver 708 as reflected transmission 706. Meanwhile since component 712 is not polarized parallel to the polarization vector of the reflector 704, it passes through reflector 704.

In this way, different components or modes of the wire can be selectively received by a plurality of receivers that are located in the surface wave communication system. For instance, with reference to FIG. 1, quasi-optical coupling device 108 can receive a particular component or mode of the surface wave transmission, while quasi-optical coupling device 110 receives a different component or mode of the surface wave transmission.

In other embodiments, receiver 708 can be replaced or supplemented with a transmitter that can transmit polarized transmissions. Transmissions that are polarized parallel to the wire (horizontally polarized) can be reflected by reflector 704 and propagate as surface waves to the left along the wire 702. Transmissions that are not polarized horizontally can pass through the reflector 704 without being reflected.

Figure 8:
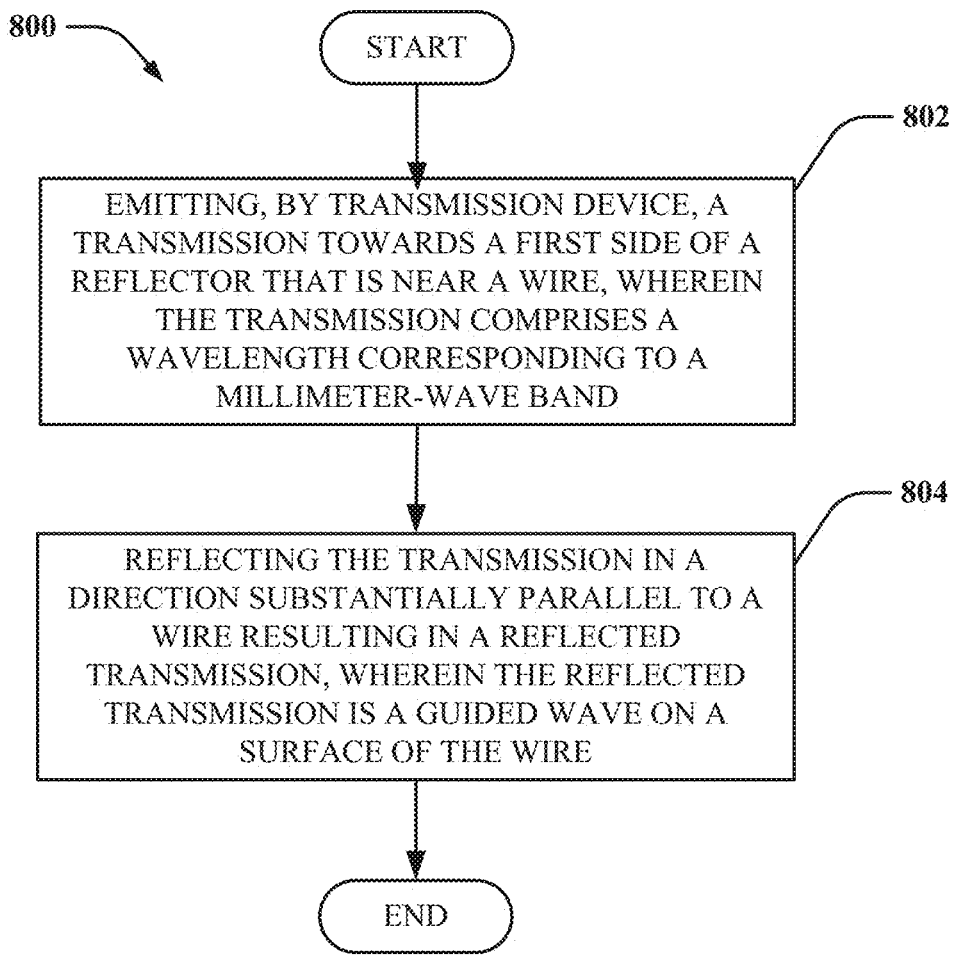
FIG. 8 illustrates a flow diagram of an example, non-limiting embodiment of a method for transmitting a transmission with a quasi-optical coupler as described herein.
Figure 9:
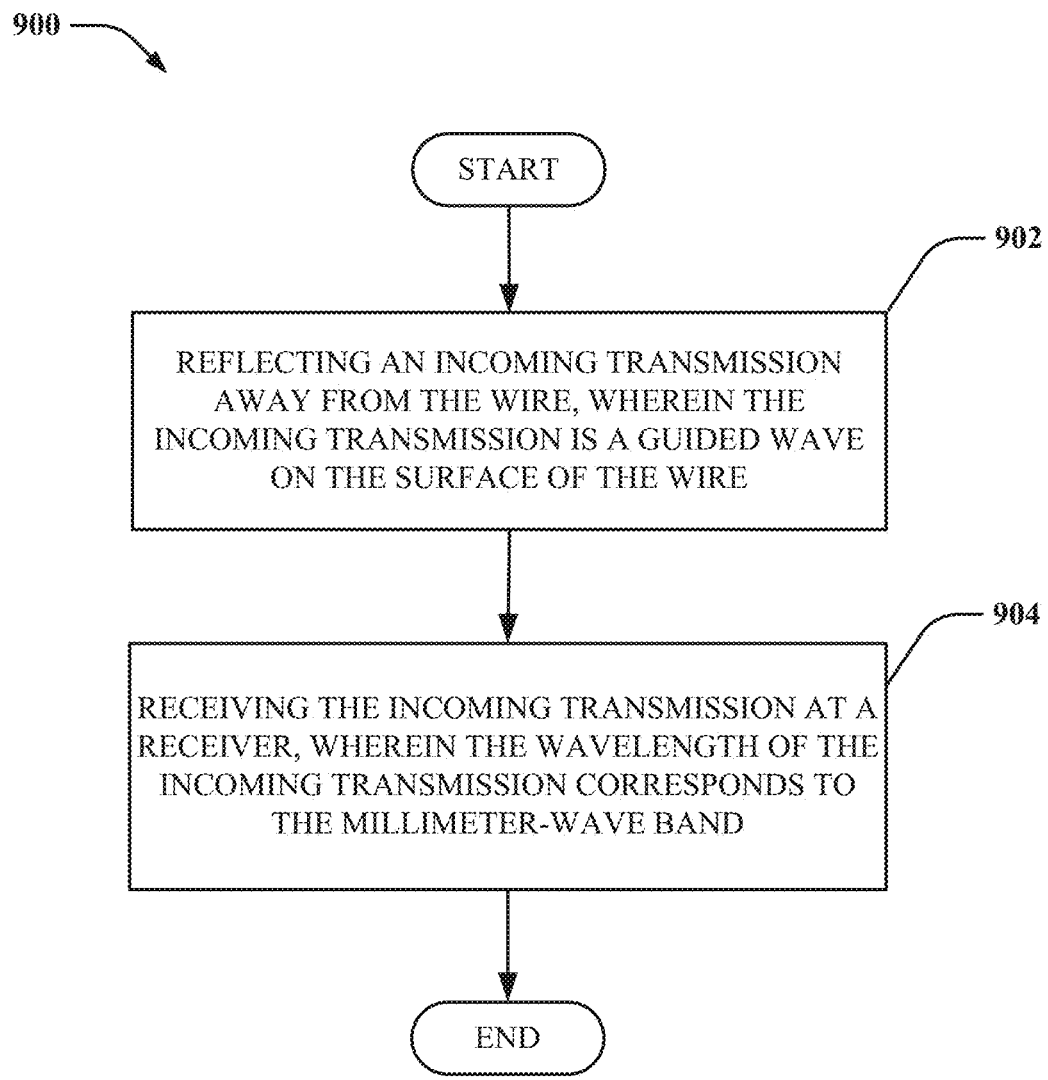
FIG. 9 illustrates a flow diagram of an example, non-limiting embodiment of a method for receiving a transmission with a quasi-optical coupler as described herein.

FIGS. 8 and 9 illustrate a process in connection with the aforementioned systems. The processes in FIGS. 8 and 9 can be implemented for example by systems 200 and 300 illustrated in FIGS. 2-3 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram of an example, non-limiting embodiment of a method for transmitting a transmission with a quasi-optical coupler as described herein. Method 800 can begin at 802 where a transmission emitted by a transmission device towards a first side of a reflector that is near a wire, wherein the transmission comprises a wavelength corresponding to a millimeter-wave band. The transmission that is generated by a transmitter can be based on a signal received from a base station device or a mobile device. A lens, dielectric or otherwise, can focus the millimeter-wave transmission towards a reflector.

At 804, the transmission is reflected in a direction substantially parallel to a wire resulting in a reflected transmission, wherein the reflected transmission is a guided wave on surface of the wire. The reflected transmission then propagates as a guided wave travelling along the wire. The guided wave, or surface wave, will stay parallel to the wire even as the wire bends and flexes. Bends can increase transmission losses, which are also dependent on wire diameters, frequency, and materials.

The transmission that is emitted by the transmitter can exhibit one or more waveguide modes. The waveguide modes can be dependent on the shape and/or design of the waveguide. After the reflection by the reflector, the one or more waveguide modes can couple to one or more surface wave modes of the guided surface wave. The surface wave modes can be different than the waveguide modes due to the different characteristics of the waveguide and the wire. In experimental results, when the circumference of the wire is comparable in size to, or greater, than a wavelength of the transmission, the surface wave exhibits a plurality of surface-wave modes. The surface wave can therefore comprise more than one type of electrical and magnetic field configuration. As the surface wave propagates down the wire, the plurality of electrical and magnetic field configurations will remain substantially the same from end to end of the wire.

Turning now to FIG. 9, illustrated is a flow diagram of an example, non-limiting embodiment of a method for receiving a transmission with a quasi-optical coupler as described herein. At 902, an incoming transmission is reflected away from a wire, wherein the incoming transmission is a guided wave on the surface of the wire. The surface wave can be a guided wave that was transmitted by a transmitter (as show in FIG. 2) and the surface wave can exhibit one or more modes that are associated with surface waves on a wire.

At 904, the incoming transmission is received at a receiver, wherein the wavelength of the incoming transmission corresponds to the millimeter-wave band. After the reflection by the reflector, the one or more surface wave modes can couple to one or more waveguide modes that are dependent on the design and configuration of the waveguide feed in the receiver. The waveguide modes can be different than the surface wave modes due to the different characteristics of the wire and the waveguide.

Figure 10:
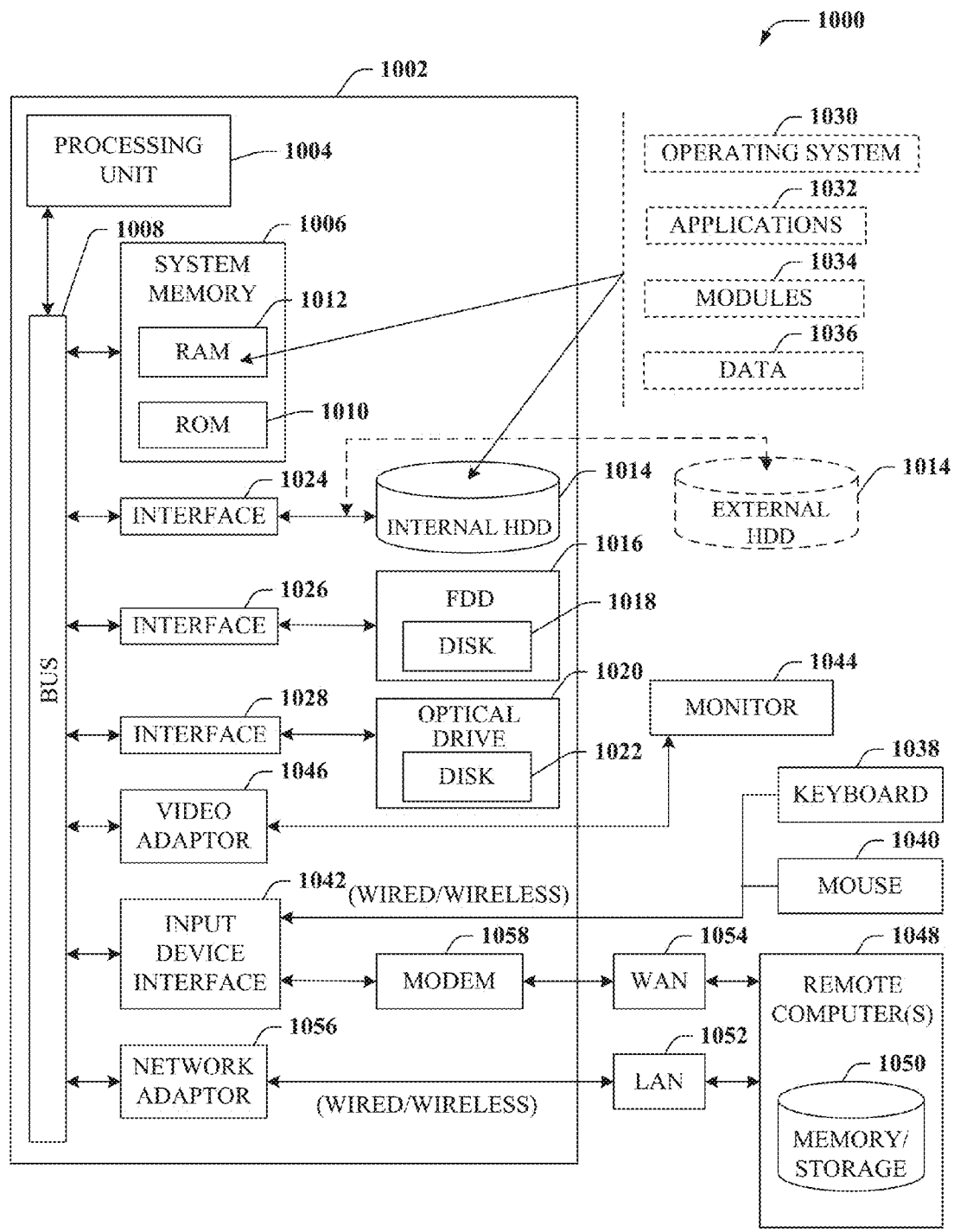
FIG. 10 is a block diagram of an example, non-limiting embodiment of a computing environment in accordance with various aspects described herein.

Referring now to FIG. 10, there is illustrated a block diagram of a computing environment in accordance with various aspects described herein. In order to provide additional context for various embodiments of the embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 11:
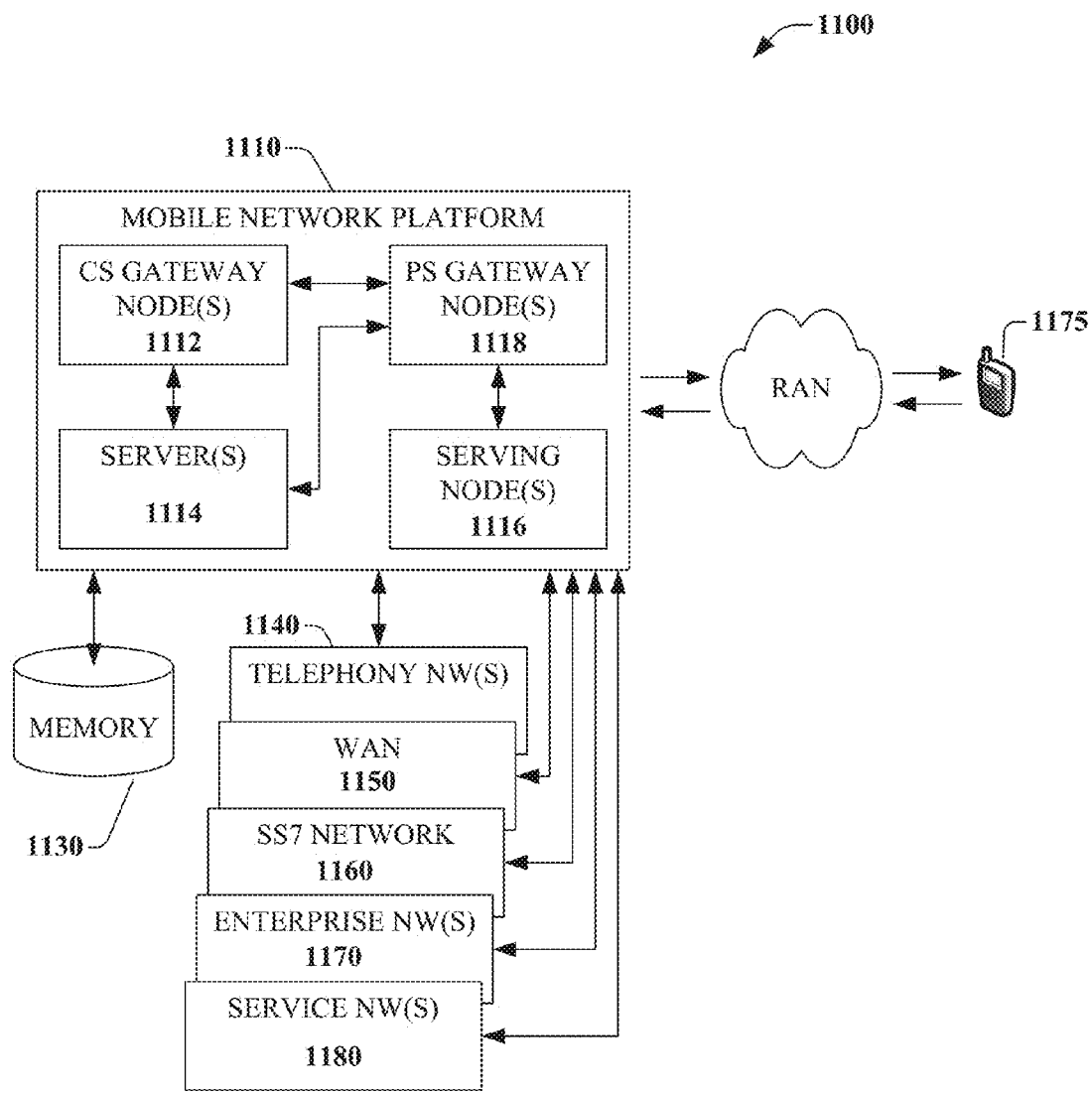
FIG. 11 is a block diagram of an example, non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
   an antenna that facilitates reception of a wireless signal; and
   a transmitter coupled to the antenna, wherein the transmitter facilitates emitting a focused transmission that is based on the wireless signal, and wherein the focused transmission is directed to a focal plane of a reflector;
   wherein the reflector, positioned with respect to a transmission medium, facilitates reflecting from the focal plane the focused transmission thereby generating a guided wave that propagates along the transmission medium.

2. The apparatus of claim 1, wherein the focused transmission is reflected in a first direction by a side of the reflector, and wherein the apparatus further comprises:
   another transmitter that emits another transmission directed towards another side of the reflector, wherein the reflector facilitates reflecting the another transmission substantially parallel to the transmission medium in a second direction substantially opposite to the first direction.

3. The apparatus of claim 1, wherein a wavelength of the focused transmission is smaller than a circumference of the transmission medium.

4. The apparatus of claim 1, wherein the transmission medium comprises an insulated conductor.

5. The apparatus of claim 1, wherein the transmission medium comprises an uninsulated conductor.

6. The apparatus of claim 1, wherein the transmitter comprises a lens, and wherein a focus of the lens is directed to the focal plane of the reflector.

7. The apparatus of claim 6, wherein a focal plane of the lens is at an intersection area of the transmission medium and the reflector.

8. The apparatus of claim 1, wherein the antenna is part of a distributed antenna system comprising at least one additional antenna.

9. The apparatus of claim 8, wherein the antenna is attached to a fixed structure and the at least one additional antenna is attached to at least one other fixed structure.

10. The apparatus of claim 9, wherein the fixed structure comprises a utility pole and the at least one other fixed structure comprises at least one other utility pole.

11. The apparatus of claim 1, wherein the guided wave is directed, by the reflector, towards a base station.

12. The apparatus of claim 11, wherein the base station is coupled to a macrocell site.

13. An apparatus, comprising:
   an antenna, wherein the antenna facilitates reception of a wireless signal;
   a reflector having a focal plane, wherein the reflector is positioned with respect to a transmission medium; and
   a transmitter coupled to the antenna, wherein the transmitter facilitates emitting, responsive to the wireless signal, a focused transmission, and wherein the focused transmission is directed to the focal plane of the reflector;
   wherein the reflector facilitates reflecting from the focal plane the focused transmission to generate a guided wave that propagates along the transmission medium.

14. The apparatus of claim 13, wherein the reflector is polarized to facilitate reflecting the focused transmission and enabling another guided wave propagating along the transmission medium to propagate through the reflector.

15. The apparatus of claim 13, wherein the transmission medium comprises a telephone line or a power line.

16. A method, comprising:
   receiving, by an antenna, a wireless signal; and
   emitting, by a transmitter coupled to the antenna, a focused transmission that is based on the wireless signal, wherein the focused transmission is directed to a focal plane of a reflector;
   wherein the reflector, positioned with respect to a transmission medium, reflects from the focal plane the focused transmission, thereby generating a guided wave that propagates along the transmission medium.

17. The method of claim 16, further comprising receiving the guided wave at a coupling device that is coupled to a base station.

18. The method of claim 17, wherein the coupling device comprises a quasi-optical coupling device.

19. The method of claim 16, wherein the guided wave is directed, by the reflector, towards a base station.

20. The method of claim 16, wherein the transmission medium comprises a telephone line or a power line.

* * * * *